(12) United States Patent
Rooney

(10) Patent No.: US 8,218,763 B2
(45) Date of Patent: Jul. 10, 2012

(54) METHOD FOR ENSURING THE VALIDITY OF RECOVERED ELECTRONIC DOCUMENTS FROM REMOTE STORAGE

(75) Inventor: John G. Rooney, Biot (FR)

(73) Assignee: International Business Machines Corporation, Armonk, NY (US)

( * ) Notice: Subject to any disclaimer, the term of this patent is extended or adjusted under 35 U.S.C. 154(b) by 530 days.

(21) Appl. No.: 12/427,963

(22) Filed: Apr. 22, 2009

(65) Prior Publication Data

US 2010/0275030 A1    Oct. 28, 2010

(51) Int. Cl.
*H04N 7/167* (2011.01)
*H04L 9/00* (2006.01)
*H04L 29/06* (2006.01)
*G06F 7/04* (2006.01)

(52) U.S. Cl. ........ 380/201; 380/277; 380/278; 380/282; 380/283; 380/285; 380/44; 726/1; 726/2; 726/3; 726/4; 726/6; 726/10; 726/26; 726/27; 726/29; 726/30; 726/34; 713/161; 713/165; 713/170; 713/171; 713/176; 713/178; 713/180; 713/181

(58) Field of Classification Search ........ 380/201, 380/277; 713/165, 181; 726/26
See application file for complete search history.

(56) References Cited

U.S. PATENT DOCUMENTS

| | | | |
|---|---|---|---|
| 6,122,738 A * | 9/2000 | Millard | 713/187 |
| 6,839,763 B1 * | 1/2005 | Kamvysselis et al. | 709/230 |
| 6,988,123 B2 * | 1/2006 | LeClair et al. | 709/201 |
| 7,681,246 B1 * | 3/2010 | Chen | 726/30 |
| 2002/0013825 A1 * | 1/2002 | Freivald et al. | 709/218 |
| 2003/0177178 A1 * | 9/2003 | Jones et al. | 709/203 |
| 2004/0078337 A1 * | 4/2004 | King et al. | 705/51 |
| 2006/0130154 A1 * | 6/2006 | Lam et al. | 726/30 |
| 2006/0242088 A1 * | 10/2006 | Yamamoto et al. | 705/76 |
| 2007/0016785 A1 * | 1/2007 | Guay et al. | 713/176 |
| 2007/0038913 A1 * | 2/2007 | Allen et al. | 714/758 |
| 2007/0055834 A1 * | 3/2007 | Malkin | 711/162 |
| 2007/0135216 A1 * | 6/2007 | Martinek et al. | 463/29 |
| 2007/0220614 A1 * | 9/2007 | Ellis et al. | 726/27 |
| 2009/0199301 A1 * | 8/2009 | Chandrasekaran et al. | 726/27 |
| 2009/0210714 A1 * | 8/2009 | Haider et al. | 713/176 |
| 2009/0240717 A1 * | 9/2009 | Mimatsu | 707/101 |
| 2009/0290714 A1 * | 11/2009 | Charles et al. | 380/278 |
| 2010/0011435 A1 * | 1/2010 | Wee et al. | 726/15 |
| 2010/0287192 A1 * | 11/2010 | Kottomtharayil et al. | 707/769 |

\* cited by examiner

*Primary Examiner* — Edan Orgad
*Assistant Examiner* — Jenise Jackson
(74) *Attorney, Agent, or Firm* — Scully, Scott, Murphy & Presser, P.C.; Daniel P. Morris, Esq.

(57) ABSTRACT

A method for electronically storing and retrieving at a later date a true copy of a document stored on a remote storage device comprises: sending a document in electronic format from a document owner's computing device to a store entity for storing the document; generating a digest of the document while the document is at the store entity by applying a hash function to the document; signing the digest electronically with a key while said document is at the store entity; generating a receipt that includes the digest and the key; sending the receipt to the document owner; and verifying, at the document owner's computing device, that the received receipt corresponds to the document sent from the owner's computing device.

14 Claims, 3 Drawing Sheets

METHOD FOR ENSURING THE VALIDITY OF RECOVERED ELECTRONIC DOCUMENTS FROM REMOTE STORAGE

BACKGROUND OF THE INVENTION

1. Field of the Invention

This invention relates generally to information handling networks for storing a document and more specifically to method and system for insuring that a document retrieved from storage is the document that was initially stored.

2. Description of the Related Art

Advances in network communications and Public Key Infrastructure ("PKI") technology have prompted individuals and businesses to utilize electronic documentation for record keeping and storage of all types of documents. Database management systems coupled with computer memories capable of storing several gigabytes of data have made it practical for individuals and businesses to dispense with maintaining paper records. For individuals, important paper and electronic documents including videos and photos can be stored electronically for safe keeping. For business, electronic storage can help reduce the cost of storing large amounts of paper and facilitate the transfer of documents between parties. Typically, in business, data originating in one entity may have to be transmitted to others for any number of reasons such as for deposit or for deposit and review, etc. The data elements can be in the form of unstructured document files or structured records, such as bank account and other financial information. When storing unstructured data, it may be necessary to forward a document from an originating system to other computers in the same system or to computers residing on different systems for storage prior to forwarding the document for review such as a proposal for a joint venture or a bid tender.

In those instances where a document is to be reviewed by another, rather than circulating the document, the document owner can let an intended viewer know that it is available and provide the viewer with access to it. To review the document, the authorized viewer must be given access to the storage location of the document.

There are a number of reasons why an individual or business document owner will not want to store the document locally. If local document storage means giving open access, behind its firewall, to other entities, a security risk may be created. Access into local storage may also compromise the existence of the document as an inadvertent action by an owner or a viewer may result in the document file being erased. Additionally, in the business community, a document owner's local machine or LAN may not be available at all times to accommodate a review of a document by a third party.

One solution is to use the repository of a third party, particularly one in the business of providing the service of a secure data repository and is able to provide proof and accuracy of the receipt of a document being deposited.

An important consideration not addressed when storing documents is that the integrity and access to the data stored in the repository should not be dependent on the actions of the third party that administers the document repository. In other words, the data custodian should not be able, through either inadvertent or malicious actions, to modify the contents of the data without that action being detected by the system users. Moreover, the data custodian should not be able to alter a user's privilege to, or restriction from, access to a data element.

Private individuals have increasingly large number of important electronic documents including, but not limited to photos and videos. These documents are typically stored on an internal or external hard drive. The possibility of theft or failure of the devices on which the documents are stored is such that remote storage of the documents is desired.

Referring to FIG. 1, there is shown a prior art arrangement for a third party document storing entity. A document owner 100 such as desk top PC having a document in memory sends the document via connection 102 to remote document repository service such as store entity 104 that has a database. As the owner of the document deposited, the document owner can either assign permission to another to access the document or restrict permission to access to all others. For example, the document owner may assign a business partner having a PC 106 to have a "read" privilege, which means that the assigned business partner can retrieve the document via connection 108 to the store entity 104, but cannot make changes to the document.

In the prior art system, the document deposited by the document owner is normally not encrypted so that a business partner will be able to review the document on demand. This is because document decryption normally only requires access to a private key of the document owner. To deny access to the private key requires the document owner to either be available at all times online when decryption might be requested in order to perform the decryption itself, or the document owner must set up a procedure in advance to make the private key available directly to the business partner.

In prior art systems where documents are deposited for a period of time and are not encrypted as shown in FIG. 1, the store entity 104 must be trusted with maintaining the integrity of the document.

Currently there is no mechanism for actually demonstrating that the documents recovered from the external storage are those that were sent by the document owner to be stored. While it is possible after having copied a document to a remote storage, and then have it copied back to the sender, to check that the copy that was sent back to the document owner was actually stored. This only shows that the document was available at the time the second copy was made. It is no guarantee that it will still be there in the future or that the copy that is stored and that will be returned to the document owner at a future date will be an exact copy of the original document. The problem is exacerbated by the fact that the process must be automated and initiated by users who are not necessarily capable of determining whether the process has successful stored an exact copy of the document sent by an owner. Absent a method and system to determine that the document sent by an owner is the same as the copy of the document that is in storage may lead to a user believing that a true copy of the document has been stored when, in fact and as a result of a network failure, the process was not completed. This failure will first be apparent to the document owner when an unsuccessful attempt is made by the document owner to retrieve the document.

It cannot be assumed that a document that is sent electronically over the Internet or other open networks will arrive at a remote storage intact and tamper-free.

SUMMARY OF THE INVENTION

There is disclosed, in one embodiment, a method for electronically storing and retrieving at a later date a true copy of a document stored on a remote storage device comprising:

sending a document in electronic format from a document owner's computing device to a store entity for storing said document;

generating a digest of said document while said document is at said store entity by applying a hash function to the document;

signing said digest electronically with a key while said document is at said store entity;

generating a receipt that includes said digest and said key;

sending said receipt to said document owner; and verifying that the received receipt corresponds to the document sent from the owner's computing device.

In another embodiment there is disclosed a computer program product for use with a computer, the computer program product including a computer readable medium having recorded thereon a computer program or program code for causing the computer to perform a method for electronically storing and retrieving at a later date a true copy of a document stored on a remote storage device comprising:

sending a document in electronic format from a document owner's computing device to a store entity for storing said document;

generating a digest of said document while said document is at said store entity by applying a hash function to the document;

signing said digest electronically with a key while said document is at said store entity;

generating a receipt that includes said digest and said key;

sending said receipt to said document owner; and verifying that the received receipt corresponds to the document sent from the owner's computing device.

The foregoing has outlined, the preferred feature of the present invention so that those skilled in the art may better understand the detailed description of the invention that follows. Additional features of the invention will be describe hereinafter that form the subject of the claims of the invention. Those skilled in the art should appreciate that they can readily use the conception and specific embodiment as a base for designing or modifying the structures for carrying out the same purposes of the present invention and that such other features do not depart from the spirit and scope of the invention in its broadest form.

BRIEF DESCRIPTION OF THE DRAWINGS

Other aspects, features, and advantages of the present invention will become more fully apparent from the following detailed description, the appended claims, and the accompanying drawings in which similar elements are given similar reference numerals.

DETAILED DESCRIPTION OF THE INVENTION

Figure 1:
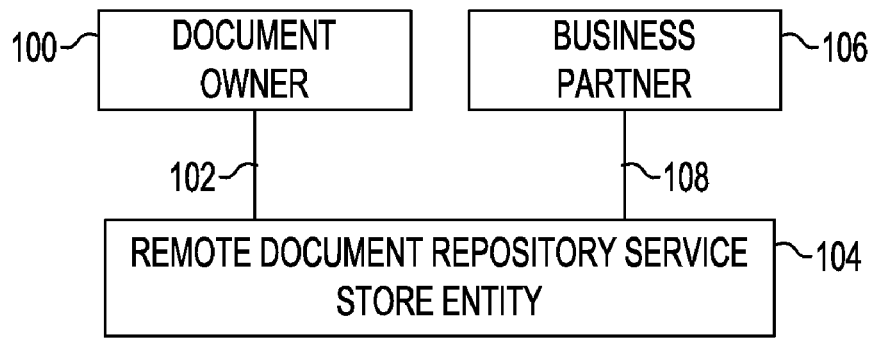
FIG. 1 is a block diagram of a prior art document repository system.

In the description of the invention, the term "one way hash function" is a function that, when applied to a document, creates a document that is almost impossible to produce in another document. When the same function is applied to the original document, the original document will result. Several such hash functions are known in the literature, for example MD5, SHA, etc. The set of bytes created is commonly referred to as a digest. A hash function is applied to the document to produce a digest. A digest is in general much smaller than the original document. For example, SHA1 produces a digest of length 160 bits. So an original document of size (say) 10 MBits results in a digest of 160 bits. The original document is NOT recoverable from the digest, but as the hash is fair, it is highly unlikely different documents produce the same digest. This is the crucial fact that allows us to create small electronic receipts. A public key is a form of cryptography in which a key is used to encrypt a message and differs from the key used to decrypt it. In public key cryptography, a user has a pair of cryptographic keys, a public key and a private key. The private key is kept secret, while the public key may be widely distributed. Incoming messages that have been encrypted with the recipient's public key can only be decrypted with the corresponding private key. The keys are related mathematically, but the private key cannot easily be derived from the public key. Conversely, a private key uses a single secret key for both encryption and decryption.

Documents signing can be with a public key or an entity can sign a document using a private key. A document is normally signed with a private key but is verified with a private key as no one knows the private key. By applying the corresponding known public key to the signature any other entity can prove that the entity signed it.

In one embodiment of the invention a digest and a signature is used to produce a receipt for a document or set of documents sent by an individual or a business to an entity for storing documents in an electronic format. The receipt includes a digest of the document, or set of documents sent by the document owner and a date when the term for storage ends. In addition, the receipt may include other information such as a label supplied by the sender. A store entity that receives and stores the document creates a digest of the document, adds a date of expiration, signs the digest and sends the receipt back to the sender, the document owner. The sender then determines if the document received is an exact duplicate of the document that was initially sent to the store entity by the document owner. Upon receiving the receipt from the store entity, the document owner determines if the received document is an exact copy of the original document by applying the appropriate (public or private) key and using the same hash function that was applied to the same document or set of documents by the store entity. At some later date the document owner can request return of the documents by sending a copy of the receipt to the store entity and, upon receiving the receipt, the store entity will return the documents. When the returned document is received, the checks used when the document was first received and stored are now used by the document owner to determine if the document received is a true copy of the original document.

If the owner of the document has a public key, the document owner can remove the document from storage by combining the receipt with a removal order, sign the receipt and send it to the store entity. The store entity can then prove that removal of the document was requested. An owner can periodically extend the time of storing a document at the store entity by renewing the receipt where the renewed receipt can be the same as the old receipt but the expiration date is changed. Upon receiving a new receipt, a document owner can again check to determine that the digest of the old receipt and the digest of the new receipt match.

A receipt can be small and can be in a readable form that is printed out. Typically digests are between 128 and 256 bits long. A receipt printed on paper can be made to be machine readable. The store entity may send a paper document such as a letter to the document owner, who can then use the letter to request return of the document if, for example, their computer containing the receipt was stolen or failed.

A document repository system of a preferred embodiment of the present invention provides an enhanced web server environment that implements a "secure location" of the environment of the store entity. Resources contained within the secure location are available only when accessed by the document owner using a certified public or private key. Depending on the environment, access may be through the document owner's web browser.

The information content to be stored at the secure location is encrypted for privacy. Each secure location on a store entity server has a unique encryption key and mechanisms that can inhibit access to the keys except through a path approved by the owner of the secure location, such as through a browser. Programs that run within a secure location are isolated by operating system services to ensure that the programs operate in a process with a system identity so that the identity of a program is available to dependent processes without the possibility of alteration by a program operating in the secure location. The programs must also have access to the data content of the secure location in which they are running, but to no other; and which can prevent tampering and "Trojan Horse" attacks.

Programs operating in the secure location can deposit information in the same secure location or in other secure locations having secure access to each other's public keys. Normally, the secure location will be located on the same secure location server, but can be on different secure location servers with access to a common authority which can provide public key information. In the context of a secure location repository, "deposit" can mean different things. In one implementation, deposit can refer to encrypting the data with the encryption key of a target secure location and signing the data in the signature key of a depositing secure location. Secure location programs cannot directly access either encryption or signature keys. This is done through an authority that provides public keys. Optionally, the "deposit" function can place information in a queue contained in a target secure location. All of the "deposit" functions provide a means to pass information among secure locations in such a way that their origin process cannot be denied; their content cannot be viewed by those with the ability to inspect inter-process communication buffers; and the document received by the secure location and the document sent from the secure location to the document owner is identical to the original document that was first sent by the document owner to the secure location.

Figure 2:
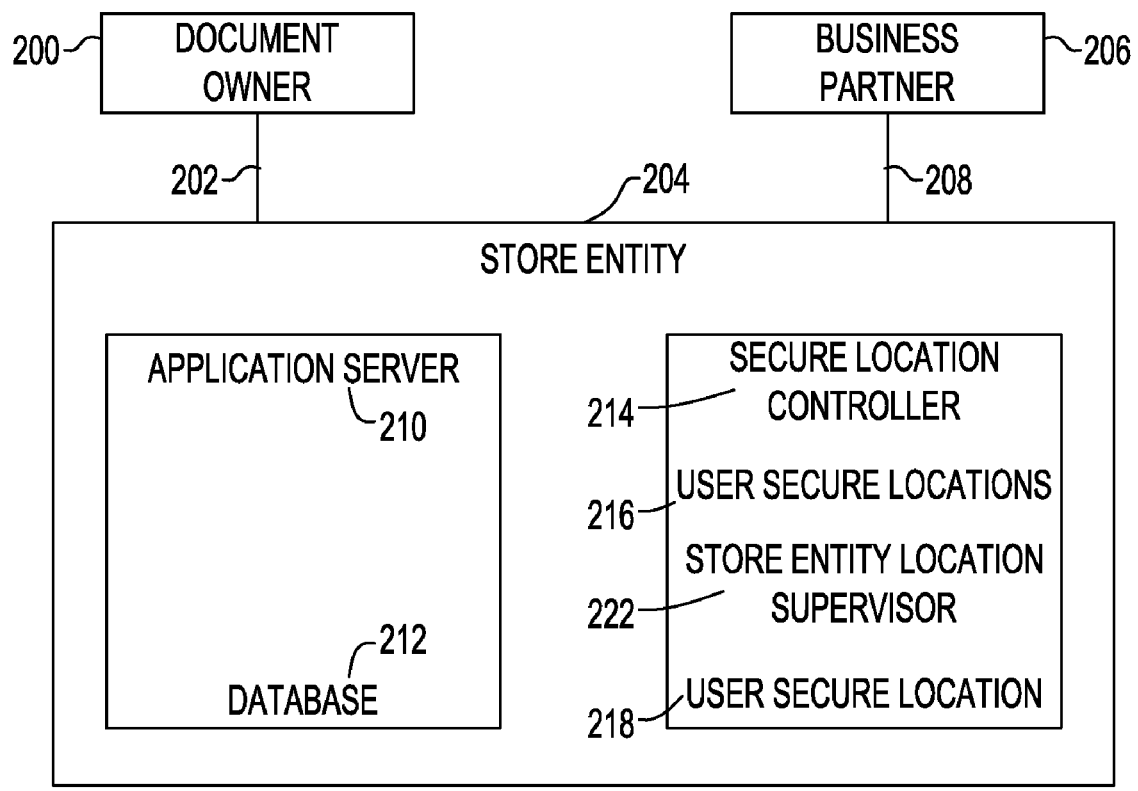
FIG. 2 is a block diagram showing a document repository system according to the principled of the invention.

Referring to FIG. 2, there is shown an embodiment of the invention having a document owner 200 such as a computing device that can deposit documents via connection 202 into store entity 204 where the owner of the deposited documents has the option to elect to restrict access to all other parties or to assign levels of access to the documents to third parties 206, such as business partners, who gain access to the documents in the store entity 204 via their own network connections 208.

The store entity 204 can comprise two components, an application server 210 and a secure location controller 214. The application server can have a program to administer a database repository 212, which may be a part of application server 210 or it may be remotely located on a closed network. Secure location controller 214 can include a number of components such as user secure locations 216, 218 which are assigned on an individual basis to document owners 200 and business partners 206, an application server secure location assigned to application server 210, and a secure location supervisor program 222. In the instance where the document is a private document stored by a user where only the document owner has access to the stored document, only the user secure location 216, 218 is used.

A user secure location 216 or 218 can be accessed only by a document owner 200 or, if granted authorization, a business partner 206 to whom the secure location has been assigned, upon proper authentication. Individual secure locations do not have direct access to the document database 212 where access is through an application server secure location and application server 210.

Application server component 210 does not run on a trusted computing base, but can execute on any computing platform. The application server can run in the secure location assigned to it in the secure location server 214. Application server secure location can communicate with application server 210 and, through the application server, has access to document database 212.

Figure 3A:
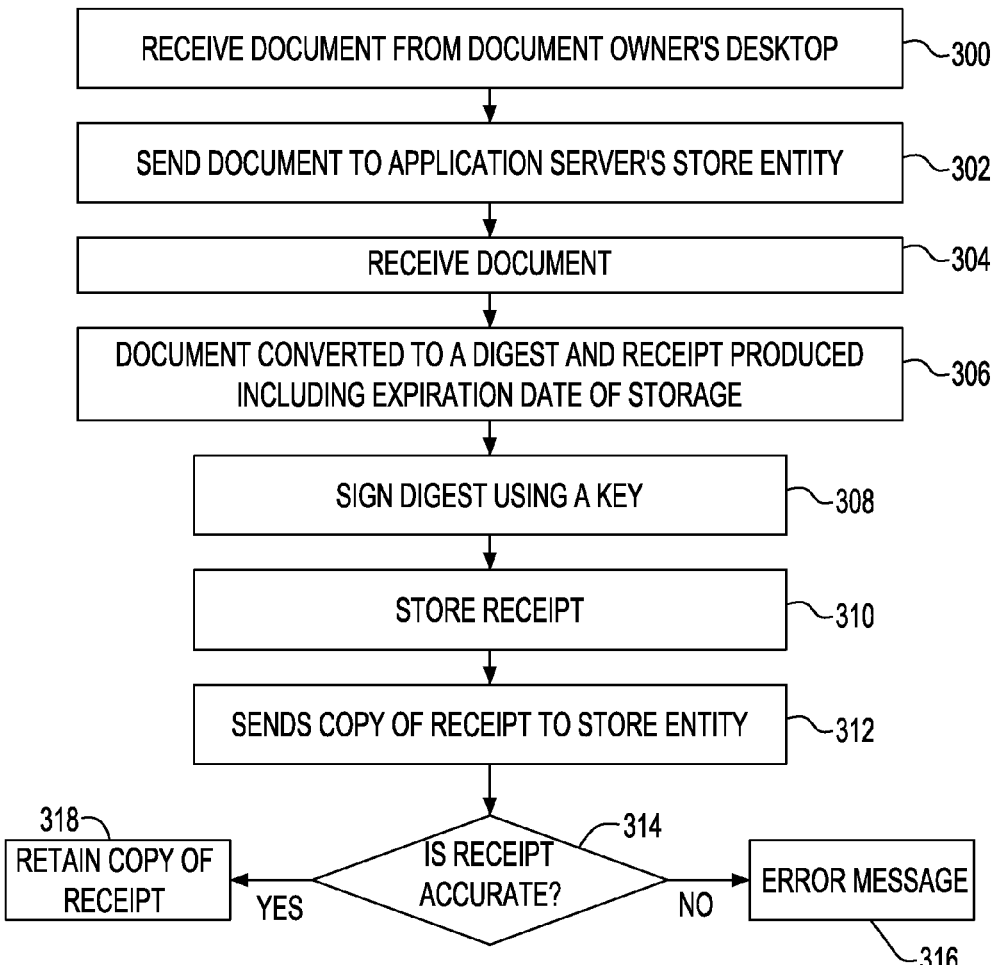
FIG. 3a is a flow chart illustrating the process of document storage in accordance with the principles of the invention and FIG. 3b is a flow chart illustrating steps for requesting return of a document.

FIG. 3a is a flow chart illustrating the process of verifying that a document placed into storage in a store entity is identical to a document that was sent by the document owner for storage at a secure entity, and that the document retrieved from the secure entity is identical to the document initially sent to the secure entity by the document owner. A personal secure entity is normally a secure extension of the store entity environment. Thus, interaction between the steps in FIG. 3a is shown between a secure location associated with the document owner and an application server.

When creating a document in the data repository, the document is first sent from a document owner, a desktop PC of the document owner, to the document owner's personal secure location (block 300). From block 300, the document is sent to Application server's store entity, block 302. Thereafter, the document is received at the application server secure location, block 304. At this time the document is converted to a digest using a hash function and a receipt is produced which includes a date of a term for storing the document at block 306.

The digest is a relatively small datastructure with specific properties to guarantee security. It is a one-way function, which means that given a digest, it is not possible to obtain the original document that produced it. In addition, given a digest, it is not possible to find a second pre-image, which would have the same digest. The digest is also collision resistant. This means that two different pre-images are highly unlikely to produce the same digest.

The data element's digest is then encrypted with the document owner's secure location application's public signing key (block 308). Then, at block 308, the document is "signed" with the owner's secure location public signing key. In the preferred embodiment, both symmetric and public key asymmetric cryptography technology can be utilized.

With public key cryptography, an application has two keys, a public key and a private key, referred to as a key pair. The private key is held locally by the document owner. If access to the document is not restricted to the document owner, the public key is made available to all users, usually through a directory service.

When public key cryptography is used, a data element encrypted with the public key may only be decrypted with the corresponding private key. Similarly, data element encrypted with the private key may only be decrypted with the public key.

In symmetric key technology, a single key is used for both encryption and decryption.

Data is normally encrypted using a randomly generated symmetric key. Then, the symmetric key is itself encrypted using the user's public encryption key, and is stored with the document so that it becomes part of the document.

Continuing with FIG. 3a, the receipt which includes the digest, the electronic signature and the expiration date of the receipt is forwarded to the store entity in the application server secure location for filing and storage in document database, block 310. In addition, the receipt may include other information such as a label supplied by the sender The store entity that receives the receipt sends a copy of the receipt to the document owner's location, block 312. The document owner then determines if the document received is the same as the document that was sent by applying the public key and using the same hash function applied to the same document or set of documents, block 314. If the receipt is not accurate, an error message is returned to the application server secure location, block 316, and logged in the system. If the receipt is accurate and current, the application running the storing entity retains a copy of the receipt block 318, to be cached for future reference.

Figure 3B:
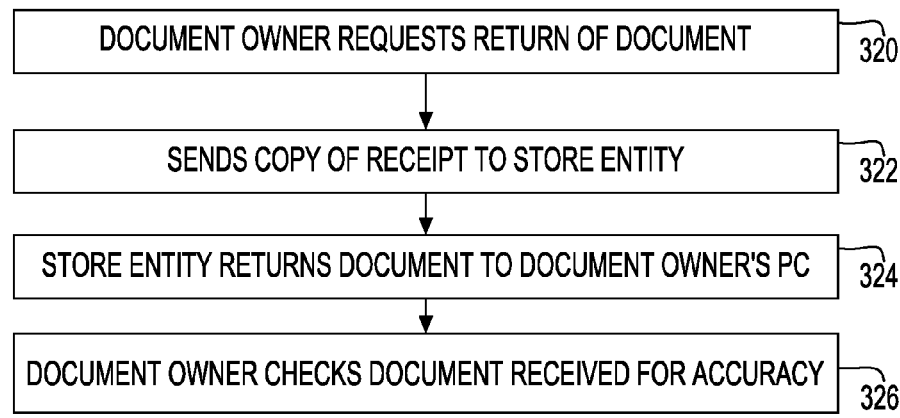

At some later time, as shown in FIG. 3b the document owner can request return of the document(s), block 320, by sending the receipt to the store entity, block 322. Upon receiving the receipt, the store entity returns the document(s) to the document owner, block 324. At this time the checks first used when the document was stored are again used by the document owner to determine if the document received is a true copy of the original document, block 326.

Figure 4:
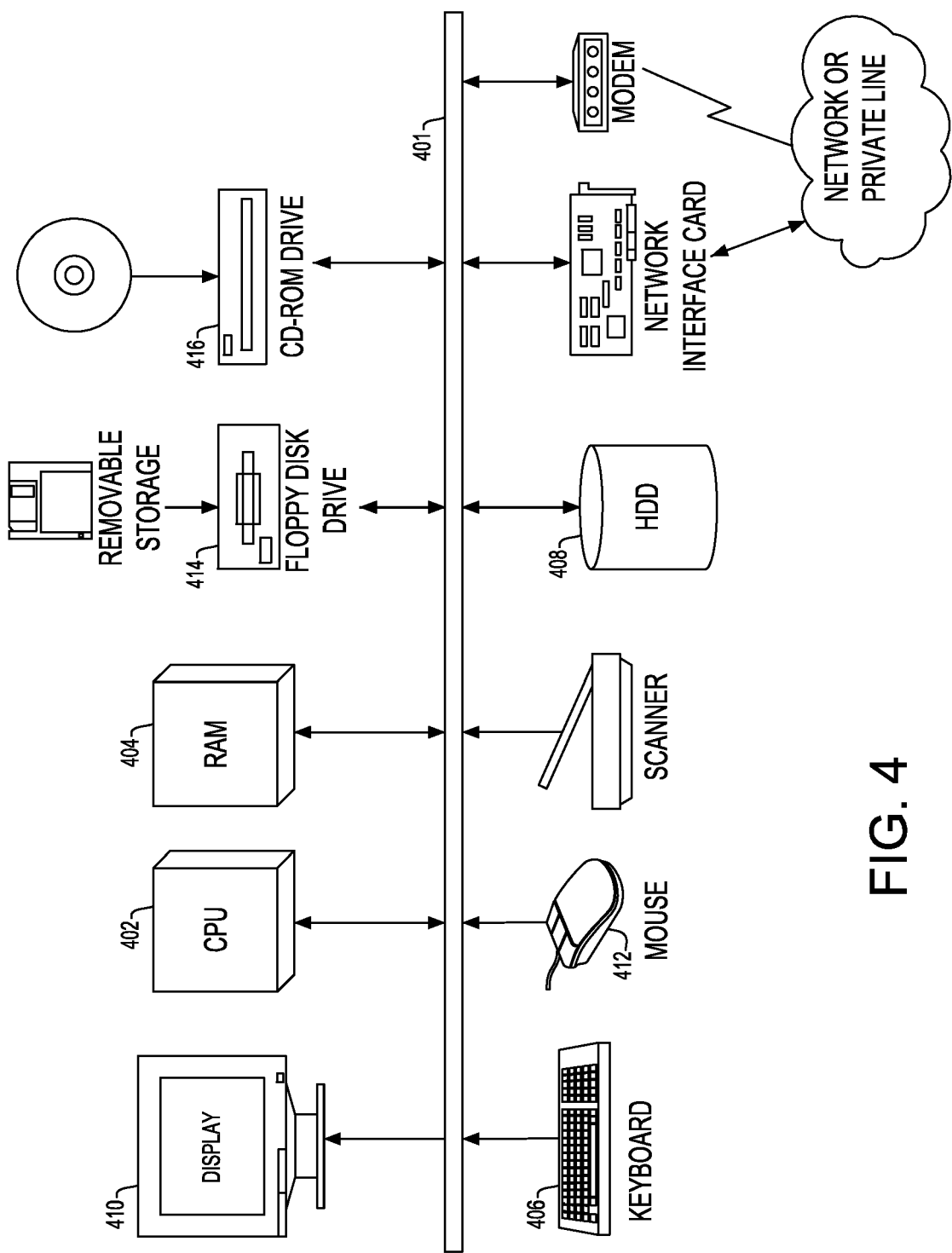
FIG. 4 is a block diagram of a computer system for use with the present invention.

The present invention can be used on any properly configured general purpose computer system, such as the system shown in FIG. 4. Such a computer system 400 includes a processing unit (CPU) 402 connected by a bus 401 to a random access memory 404, a storage device 408, a keyboard 406, a display 410, and a mouse 412. In addition, there is a floppy disk drive 414 and a CD-ROM drive 416 for entry of data and software, including software embodying the present invention, into the system on removable storage. An example of such a computer is an IBM Personal computer of the International Business Machines Corporation, such as an Aptiva personal computer operating on Microsoft Windows operating system of the Microsoft Corporation. Also in this example there can be an internet browser capable at running Java such as Netscape Navigator, e.g., Netscape Communications Corporation, Internet Explorer, e.g., Microsoft Corporation.

The various method embodiments of the invention will be generally implemented by a computer executing a sequence of program instructions for carrying out the steps of the method, assuming all required data for processing is accessible to the computer. The sequence of program instructions may be embodied in a computer program product comprising media storing the program instructions. As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the method, and variations on the method as described herein. Alternatively, a specific use computer, containing specialized hardware for carrying out one or more of the functional tasks of the invention, could be utilized.

As will be appreciated by one skilled in the art, the present invention may be embodied as a system, method or computer program product. Accordingly, the present invention may tale the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM) or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then complied, interpreted, of otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, though the Internet using an Internet Service Provider).

The present invention is described above with reference to flow chart illustrations and/or block diagrams of methods, apparatus (systems) and computer program products according to embodiments of the invention. It will be understood that each block of the flow chart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instructions means which implement the function/act specified in the flowchart and/or block diagram block of blocks.

The computer program instruction may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although an example of the present invention has been shown and described, if would be appreciated by those skilled in the art that changes might be made in the embodiment without departing from the principles and spirit of the invention, the scope of which is defined in the claims and their equivalents.

What is claimed is:

1. A method for electronically storing and retrieving at a later date a true copy of a document stored on a remote storage device comprising:
   receiving, at a store entity, a document in electronic format sent from a document owner's computing device to said store entity for storing said document, said store entity remotely located from said computing device;
   generating, by said store entity, a digest of said document while said document is at said store entity by applying a hash function to the document;
   adding to said digest a time of expiration for storing said document at said store entity;
   signing said digest electronically with a key while said document is at said store entity;
   generating a receipt that includes said signed digest and said time of expiration;
   sending, by said store entity, a copy of said receipt to said document owner;
   verifying, at the document owner's computing device, that the received receipt corresponds to the document sent from the owner's computing device; and
   subsequently renewing, by said document owner, the receipt to extend said time of expiration for storing said document, said store entity sending said renewed receipt to said owner's computing device.

2. The method of claim 1 wherein said digest is signed with a private key.

3. The method of claim 2 wherein said private key is that of the store entity.

4. The method of claim 1 wherein said verifying includes applying a public key to verify that the receipt corresponds to the document sent from the document owner's computing device.

5. The method of claim 4 wherein said hash function used for producing a receipt is used for checking said document when verifying that the receipt corresponds to the document sent from the document owner's computing device.

6. The method of claim 5 further comprising:
   requesting return of the document stored with the store entity by sending the receipt to the store entity.

7. The method of claim 6 further comprising:
   verifying that the document received is a true copy of the document sent to the store entity by applying a public key to the receipt received; and
   applying a hash function to the digest used for producing said receipt and the document received from said store entity to decrypt the digest and the document received from said store entity; and
   comparing the two decrypted documents to verify that the document received from the store entity is a true copy of the document initially sent to the store entity.

8. A computer program product for use with a computer, the computer program product including a non-transitory computer readable storage medium having recorded thereon a computer program or program code for causing the computer to perform a method for electronically storing and retrieving at a later date a true copy of a document stored on a remote storage device comprising: receiving, at a store entity, a document in electronic format sent from a document owner's computing device to said store entity for storing said document, said store entity remotely located from said computing device; generating, by said store entity, a digest of said document while said document is at said store entity by applying a hash function to the document;
   adding to said digest a time of expiration for storing said document at said store entity;
   signing said digest electronically with a key while said document is at said store entity;
   generating a receipt that includes said signed digest and said time of expiration;
   sending, by said store entity, a copy of said receipt to said document owner; verifying that the received receipt corresponds to the document sent from the owner's computing device; and
   subsequently renewing, by said document owner, the receipt to extend said time of expiration for storing said document, said store entity sending said renewed receipt to said owner's computing device.

9. The computer program product of claim 8 wherein said digest is signed with a private key.

10. The computer program product of claim 9 wherein said private key is that of the store entity.

11. The computer program product of claim 8 wherein said verifying includes applying a public key to verify that the receipt corresponds to the document sent from the document owner's computing device.

12. The computer program product of claim 11 wherein said hash function used for producing a receipt is used for checking said document when verifying that the receipt corresponds to the document sent from the document owner's computing device.

13. The computer program product of claim 12 further comprising:
   requesting return of the document stored with the store entity by sending the receipt to the store entity.

14. The computer program product of claim 13 further comprising:
   verifying that the document received is a true copy of the document sent to the store entity by applying a public key to the receipt received; and
   applying a hash function to the digest used for producing said receipt and the document received from said store entity to decrypt the digest and the document received from said store entity; and
   comparing the two decrypted documents to verify that the document received from the store entity is a true copy of the document initially sent to the store entity.

* * * * *